UNITED STATES PATENT OFFICE.

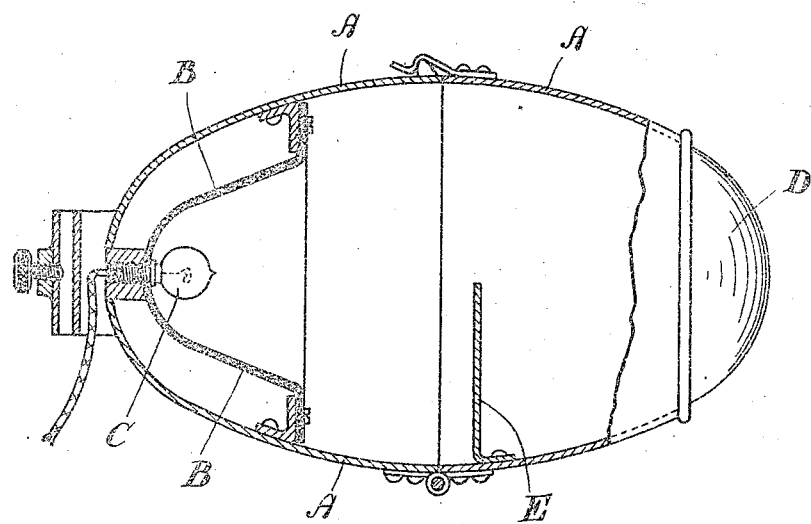

WILLIAM THOMAS COULSON, OF ANERLEY, LONDON, ENGLAND.

VEHICULAR AND OTHER LAMPS.

1,420,524.  Specification of Letters Patent. Patented June 20, 1922.

Application filed December 12, 1921. Serial No. 521,838.

*To all whom it may concern:*

Be it known that WILLIAM THOMAS COULSON, a subject of the King of Great Britain, residing at Anerley, London, England, has invented certain new and useful Improvements in Vehicular and Other Lamps (for which I have filed an application in England November 15, 1920, No. 32,204), of which the following is a specification.

This invention relates to vehicle and other lamps of the type in which auxiliary deflectors are positioned in front of the source of light to throw the light downwardly.

Now the object of this invention is to so construct the deflector that it fills the lower portion of the lamp casing completely thereby interrupting all the rays which would be projected upwards through the lens except in certain cases where the screen or wall is translucent when only a very subdued light would be projected upwards in all cases avoiding any dazzle light directed into the line of sight of a pedestrian.

My invention will be clearly understood from the following description aided by the annexed drawing which shows a sectional elevation of a lamp with my invention applied.

According to my invention I construct the casing A with part formed as or containing a paraboloid, ellipsoid or other suitably shaped reflector B in which is positioned the source of light say an electric bulb C the stem and socket of which is preferably arranged in the back of the lamp but may be arranged vertical, and between the lens D positioned in the front of the casing A and the source of light C I position an opal or opaque screen or wall E extending completely across the casing A from the bottom to nearly one half or mid distance of the height of the casing A and forming a complete division to the lower half the top edge of such wall being at approximately the focal distance of the lens D, the centres of the source of light C and the lens D and the top of the screen or wall E may be on the same level but I prefer to arrange the top of the screen or wall E slightly below the centre line of the source of light C and the lens D.

The side of the screen or wall E next to the source of light C if opaque may be silvered or polished to act as a reflector and such screen or wall E may be flat, slightly curved or semi-spherical or of any other suitable shape.

The rays from the reflector B passing above the wall E will by the lens D be reversed and passed downward on to the road with the top line of the beam approximately horizontal and in the same plane as the line connecting the centres of the light C and lens D and top of screen E so that the brilliant or dazzling effect of a bright light is thrown on to the ground and below the line of sight of pedestrians.

If the screen E is translucent or of opal glass a very subdued light which will emanate from the glass will be projected upwards by the lower half of the lens D and afford a certain amount of illumination which will not be objectionable to pedestrians when approaching the light.

The screen or wall E if translucent may be coloured.

What I do claim as my invention and desire to secure by Letters Patent, is:—

A vehicular lamp comprising a casing oval in longitudinal section, a light in one end, a parabolic reflector surrounding the light, a plano-convex lens in the opposite end, and a semi-translucent screen extending entirely across substantially the whole of the lower half of the casing and spaced from said light and lens a distance equal to the focal distance of the lens.

In testimony whereof I have hereunto set my hand in presence of two subscribing witnesses.

WILLIAM THOMAS COULSON.

Witnesses:
H. E. WRIGHT,
GEO. K. SHARP.